United States Patent Office 3,364,246
Patented Jan. 16, 1968

3,364,246
PROCESS FOR PREPARING AQUEOUS SOLUTIONS OF SILANOLS AND SILOXANOLS BY HYDROLYSIS OF ALKOXY SILANES AND SILOXANES IN AN AQUEOUS EMULSION
Gerd Rossmy, Altendorf (Ruhr), Germany, assignor to Th. Goldsmidt A.-G., Essen, Germany, a firm of Germany
No Drawing. Filed June 25, 1963, Ser. No. 290,323
Claims priority, application Germany, June 30, 1962, G 35,349
13 Claims. (Cl. 260—448.8)

This invention generally relates to the hydrolysis of organosilicon compounds and is particularly directed to a process of producing aqueous silanol and siloxanol solutions by hydrolyzing organosilicon compounds comprising at least two Si—O—C groups per silicon atom.

It has previously been suggested to prepare aqueous silanol containing solutions by hydrolysis. According to a prior art procedure, alkoxysilanes may thus be hydrolyzed in an aqueous medium according to the following formula:

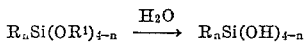

$$R_nSi(OR^1)_{4-n} \xrightarrow{H_2O} R_nSi(OH)_{4-n}$$

In this formula, R and $R^1$ stand for lower hydrocarbon groups while $n$ has the numerical value of from 0 to 2. It is known that the hydrolysis of such silanes proceeds very slowly if the pH value is in the neutral range. For this reason, it is necessary to add acid hydrolysis-inducing catalysts. Such catalysts, however, also tend to induce condensation of Si—OH groups to form Si—O—Si bridges. For this reason, the prior art hydrolysis procedures do not proceed satisfactorily. Further, since the starting compounds generally are insoluble in water, a considerable amount of auxiliary solvent has to be employed with a view to preventing precipitation of siloxanes. The presence of the acid catalysts effectively prevents the attainment of high silanol concentrations in the aqueous solution and moreover significantly affects the stability of the silanols in the solution.

Accordingly, it is a primary object of this invention to overcome the disadvantages and drawbacks of the prior art hydrolysis procedure and to provide a process which enables the preparation of stable aqueous silanol and siloxanol solutions of high concentration.

Generally it is an object of this invention to improve on the art of hydrolyzing organosilicon compounds.

Briefly, and in accordance with this invention, organosilicon compounds of the indicated kind are hydrolyzed in the neutral or acid pH range in the form of aqueous emulsions.

By subjecting the organosilicon compounds to the hydrolysis while being emulsified, the above mentioned disadvantages are entirely avoided and the hydrolysis proceeds smoothly and rapidly. Concentrated aqueous solutions of silanols and/or siloxanols are thus obtained. In the course of the hydrolysis, the emulsions are spontaneously converted into the desired solutions. The solutions are clear or only slightly turbid and may be further diluted with water.

The stability of the solutions obtained as a result of the hydrolysis is, of course, to a certain extent dependent on the composition of the respective silanol or siloxanol, the concentration of the compound in the solution, and on the pH value of the solution. Thus, for example, aqueous silanol solutions which are obtained by hydrolysis of methyltriethoxysilane remain clear for a longer period than solutions obtained by hydrolysis of dimethyldiethoxysilane. This also applies if the silanol solution contains high molecular condensation products. The stability of the silanol solutions is, of course, enhanced if the silanol contains one or several organo-functional hydrophilic groups in the silanol molecule. Solutions of methyl-hydroxypropyl-silane-diols may thus be strongly acidified and heated without causing turbidity of the solution, provided the solution contains less than 2% of the silanol.

Siloxanes may ultimately form and precipitate if the silanols in the solution have hydrophobic characteristics and are prone to condensation. If this should happen, it is an additional important advantage of the inventive procedure that the precipitating siloxanes do not separate in the form of oil droplets or gel particles, as is common in the prior art procedures, but these particles appear in finely emulsified form. Therefore, the solutions, even after the formation of precipitating siloxanes, still present substantially homogeneous systems which may be used directly for various purposes such as, for example, for impregnation.

The inventive procedure is advantageously performed in the presence of solvents and/or emulsifiers. Many different solvents may be employed. Of particular advantage are, however, solvents which are miscible with water. Thus, for example, ethanol, isopropanol and dioxane are suitable solvents. In many instances, however, the employment of such auxiliary solvents is not required, or very minor amounts of solvents yield optimum effect.

The pH value of the aqueous phase of the system may be neutral. The conversion of the emulsion into a clear solution is, however, accelerated if the pH value is displaced into the acid range, for example, to pH values of from 4 to 6. Dependent on the structure of the silanol to be formed, the acidification may be more pronounced. However, it should be appreciated that one of the essential advantages of the inventive procedure resides in the fact that, contrary to the prior art procedures, an excellent hydrolysis speed is obtained in the vicinity of the neutral range and without extraneous additions to the system.

The silicon compound content in the solution should preferably amount to about 20 to 45% by weight. It will be realized, however, that a successful hydrolysis can also be carried out at higher or lower concentrations. The concentration of the corresponding silanol or siloxanol obtained in the solution after hydrolysis is then in conformity with the concentration in the starting system.

In many instances, it is recommended to dilute the silanol solutions immediately after clearing of the system. Thus, it is advantageous to dilute the clear solution to a concentration at which the solution is to be used for the particular purpose. It may also be advantageous to neutralize the solution.

The preparation of the emulsions may be carried out according to known procedures. The so-called "inversion method" is particularly recommended. The nature of the emulsifying procedure to be adopted will many times be dependent on the nature of the emulsifier in the event that an emulsifier is required.

Generally speaking, it may be stated that any kind of surfactant, that is a nonionogenic, anionic, or cationic emulsifier may be employed for preparing the emulsion which latter thereafter is to be subjected to the hydrolysis. However, of particular interest are organosilicon emulsifiers. Copolymers of organopolysiloxanes and polyalkylenoxide units are thus particularly suitable emulsifiers. Such organosilicon emulsifiers are disclosed in German patent application G 34,932 and in German Auslegeschrift 1,093,095. Other suitable organosilicon emulsifiers are sulfuric acid ester derivatives of organosilicon alcohols such as, for example, disclosed in U.S. Patent 3,109,012 and German patent application G 34,233. Reference is also had to Belgian Patent 595,097 which contains disclosure of suitable organosilicon surfactants.

Such Si-organic emulsifiers may be represented for example by siloxane mixtures of the general average formula

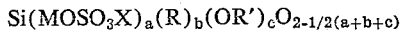
$$Si(MOSO_3X)_a(R)_b(OR')_cO_{2-1/2(a+b+c)}$$

$a = 0.005–0.1$, preferably $0.01–0.05$
$b = 1.5–2.2$, preferably $1.8–2.0$
$c = 0–0.3$, preferably $0.02–0.1$
$(a+b+c) = 1.6–2.3$, preferably $1.83–2.2$
M = alkylene radical, which bridges the silicon and oxygen through at least 3 carbon atoms, preferably $-(CH_2)_3-$, $-(CH_2)_4-$,
X = metal equivalent, as for example Na, K, ½ Ca, ⅓ Al or preferably $NR''_4$, whereby $R''$ = H, substituted or unsubstituted alkyl, aryl and mixtures of these substituents,
R = alkyl or mixtures of alkyl, substituted alkyl and aryl, preferably $CH_3$,
R' = hydrogen, alkyl or aryl, or mixtures of these radicals, preferably an alkyl of 1–4 carbon atoms.

This formula includes, for example, siloxane mixtures of the average formula

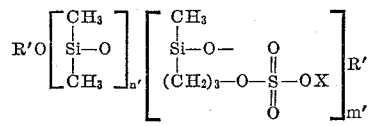

whereby
$n'$ = preferably 10–100
$m'$ = preferably 1–3
$n'/m'$ = preferably 10–100
R' and X have the meanings defined above.

The applied emulsifiers may also be mixed with alkoxysiloxanes having for example the average formula

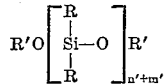

which according to the manufacturing method of said emulsifiers are often present and which while not supporting the emulsification process do not disturb it either.

Moreover the siloxanes according to the invention may also contain tri- or monofunctional siloxane units as

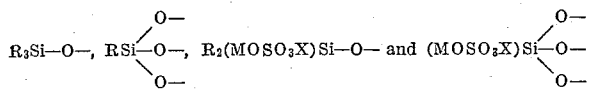

Another kind of Si-organic emulsifiers are for example the following siloxane mixtures

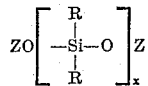

$x = 2–100$, preferably 8–40
$Z = (C_2H_4O)_y(C_3H_6O)_z R'$, R' has the meaning defined above.
$y, z$ are whole numbers, preferably 1–35
$x+y$ being preferably 5–40.

The terminal Si-atom being preferably bonded via oxygen to a propyleneoxide unit.

Examples for siloxanes which can be used as emulsifiers are also siloxanes of the formula

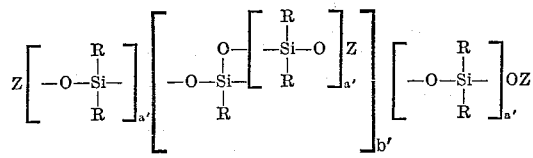

Z and R have the meanings defined above.
$a' = 1–100$, preferably 2–15
$b' = 1–50$, preferably 1–10

All the Si-containing emulsifiers as described herein are collectively being referred to as "organosilicon emulsifiers."

It will be appreciated that the use of organosilicon emulsifiers has the advantage that such emulsifiers are chemically closely related to the condensation products of the silanols and thus prevent contamination of the system by extraneous emulsifiers which are chemically non-related and oftentimes exhibit pronounced polar and hydrophilic characteristics.

As a general proposition, it may be stated that an emulsifier content of about 0.3 to 5% by weight, calculated on the organosilicon substance is sufficient to prepare the emulsion. It should be emphasized, however, that the presence of an emulsifier to produce the emulsion is not a prerequisite. It is possible to prepare the emulsion in the absence of emulsifiers. For example, the specific weights of the organosilicon compound and the aqueous phase may be adapted to each other by adding to the system suitable solvents or thickeners. Further, by passing the system through an emulsifying machine the same result may be obtained. Of course, many different procedures are known in the art to form emulsions.

As initially set forth, the invention is primarily directed to the formation of silanols and siloxanols from organosilicon compounds which contain at least two Si—O—C groups per silicon atom.

Such compounds may be represented by the formula

$$R_nSi(OR^1)_{4-n}$$

In this formula, R and $R^1$ stand for substituted or unsubstituted hydrocarbon groups and $n$ has a numerical value of from 0 to 2. In preferred embodiments, R is methyl, ethyl or vinyl and $R^1$ is methyl, ethyl, propyl or isopropyl. Compounds which are embraced by this formula are, for example, dimethyldialkoxysilane, methyltrialkoxysilane, vinyltrialkoxysilane, β-cyanoethyltrialkoxysilane, β-cyanoethyl-dialkoxysilane, β-carbethoxyethylalkoxysilane, γ-mercaptopropyltrialkoxysilane, γ-mercaptopropyl-methyldialkoxysilane, and tetraalkoxysilane. "Alkoxy" as appearing in these compounds refers predominantly to those alkoxy groups which are derived from alcohol having one, two or three carbon atoms.

However, the invention is not limited to the hydrolysis of the above enumerated compounds, but hydrolysis may equally successfully be effected with compounds of the formula

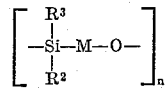

In this formula, $R^3$ stands for alkyl, preferably methyl, or is alkoxy of 1 to 3 carbon atoms, $R^2$ is alkoxy of 1 to 3 carbon atoms, M is a divalent hydrocarbon group which bridges the silicon and the oxygen through at least 3 carbon atoms, and $n$ is any desired number. A preferred M group is $(CH_2)_3$. Such compounds may be produced, for example, according to the teachings contained in U.S. patent application 133,041, now Patent No. 3,159,490. The advantages obtained according to the inventive procedure are particularly pronounced if the hydrolysis is carried out with the last-mentioned compounds. Prior to this invention, only relatively low concentrations of the silanols $$(HO)_3Si(CH_2)_3OH \text{ or } (HO)_2SiCH_3[(CH_2)_3OH]$$

in aqueous solution could be obtained by hydrolysis. Particularly with regard to polymeric starting compounds, wherein necessarily a stepwise decomposition or shortening of the polymeric chain takes place, the inventive procedure is favorably characterized by rapid hydrolysis and high silanol concentrations.

The industrial utility of the aqueous silanol or siloxanol solutions is evidently dependent on the nature of the silanol or siloxanol obtained.

Organofunctional silanols such as, for example, $$(HO)_3Si(CH_2)_3OH$$

and $CH_3(OH)_2Si$—$(CH_2)_3OH$, the mercaptopropylsilanols and vinylsilanol are primarily suitable as finishes for the impregnation of glass fibers. The γ-oxypropylsilanols referred to, in conjunction with thioglycolic acid, are suitable for the treatment of human hair and if so used condensation and partial esterification take place in the hair. The alkylsilanols in aqueous solution find utility as neutral or weakly acid agents, in the treatment of human hair, paper, glass and other silicium containing material to impart hydrophobic characteristics thereto.

The invention will now be described by several examples, it being understood, however, that these examples are given by way of illustration and not by way of limitation and that many changes may be effected in choice of raw materials and process conditions in general without affecting in any way the scope and spirit of this invention as recited in the appended claims.

*Example I*

30 grams of methyltriethoxysilane were emulsified with an organosilicon emulsifier, 25 grams of ethanol and 44.7 grams of water (pH 4). The organosilicon emulsifier was a mixture of the compounds A and B having the average formula

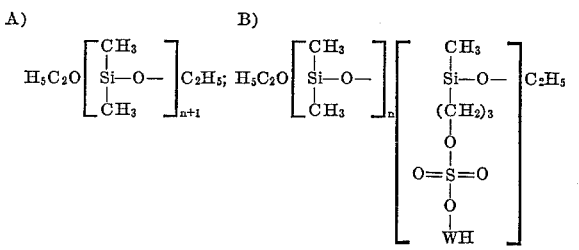

In this formula, $n=45$, $W=$isopropylamine. The weight ratio of the two compounds was about 1:2. The emulsion was passed through an emulsifying machine. Within an hour, the emulsion thus obtained formed a clear, only slightly opalescing solution. After six weeks of standing the solution had not substantially changed its appearance. The solution was diluted after the six week period without affecting its stability.

*Example II*

The procedure described in Example I was repeated, but the organosilicon compound to be hydrolyzed was, in this example, dimethyldiethoxysilane. The aqueous phase of the emulsion had a pH value of 5. The clear liquid was obtained within a few minutes upon formation of the emulsion. The clear liquid could be diluted with water to any desired concentration. The clear liquid was left to stand overnight during which time an emulsion of extremely fine particles was formed.

*Example III*

The procedure of Example I was repeated, but the organosilicon emulsifier employed in Example I was replaced by a stearic acid polyethylene glycol ester of an average molecular weight of about 550. Such emulsifiers are generally available on the market. The emulsion changed within a few minutes into a clear solution.

*Example IV*

In the same manner as described in Example I, an emulsion was formed from 1-methyl-1-ethoxy-1,2-siloxacyclopentane in predominantly polymeric form. The pH of the aqueous phase was 5.5. Within a few hours, the emulsion formed a clear solution which could be diluted without difficulty. A 30% by weight solution (calculated on the amount of starting compound) could be diluted to any desired concentration for about 30 hours. The clear solution obtained was divided into two portions. One portion was diluted with water to a 3% solution and allowed to stand for six weeks. The solution was still clear after six weeks and could thereafter be further diluted without causing turbidity.

The second portion was allowed to stand for six weeks without dilution. After the six week period, the solution was still clear. Upon adding water after the six weeks, a fine particle emulsion was formed.

*Example V*

The procedure of Example I was repeated with vinyltriethoxysilane. A clear aqueous solution was obtained which could be diluted without affecting its appearance or causing turbidity.

*Example VI*

The procedure of Example I was repeated with γ-mercaptopropyltriethoxysilane. A clear aqueous solution was obtained which could be diluted to any desired concentration.

While specific embodiments of the invention have been shown and described in detail to illustrate the application of the principles of the invention, it will be understood that this invention may be embodied otherwise without departing from such principles.

What is claimed is:

1. A process of preparing substantially clear aqueous solutions of silanols and siloxanols, which comprises hydrolyzing at a pH value below 7 and aqueous emulsion essentially consisting of 80–55% weight of water and 20–45% of an organosilicon compound selected from the group consisting of (a) $$R_nSi(OR^1)_{4-n}$$

and (b) $$\left[ \begin{array}{c} R^3 \\ | \\ -Si-M-O- \\ | \\ R^2 \end{array} \right]_x$$

wherein

R is selected from the group consisting of methyl, ethyl, vinyl, β-cyanoethyl, β-carbethoxyethyl and γ-mercaptopropyl, $R^1$ is alkyl of 1–3 carbon atoms, $R^2$ is alkoxy of 1–3 carbon atoms, $R^3$ is selected from the group consisting of alkyl and alkoxy of 1 to 3 carbon atoms, n is a number from 0–2, M is $(CH_2)_3$, and x is a positive whole number.

2. A process as claimed in claim 1, wherein the aqueous phase of the emulsion has a pH value of between about 4–6.

3. A process of preparing substantially clear aqueous solutions of silanols and siloxanols, which comprises hydrolyzing at a pH value below 7 an aqueous emulsion essentially consisting of 80–55% by weight of water and 20–45% of an organosilicon compound of the formula

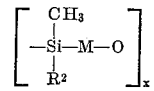

wherein $R^2$ is alkoxy of 1–3 carbon atoms, M stands for $(CH_2)_3$ and x is a positive whole number.

4. A process of preparing substantially clear aqueous solutions of silanols and siloxanols, which comprises hydrolyzing at a pH value below 7 an aqueous emulsion essentially consisting of 80–55% by weight of water and 20–45% of an organosilicon compound of the formula

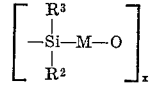

wherein R² and R³ are the same alkoxy of 1-3 carbon atoms, M stand for $(CH_2)_3$ and $x$ is a positive whole number.

5. A process as claimed in claim 1, wherein said emulsion additionally contains an organic solvent.

6. A process as claimed in claim 1, wherein said emulsion additionally contains an organic solvent which is miscible with water.

7. A process as claimed in claim 1, wherein said emulsion contains an emulsifier.

8. A process as claimed in claim 7, wherein said emulsifier is an organosilicon substance as herein defined.

9. A process as claimed in claim 1, wherein R¹ is methyl.

10. A process as claimed in claim 1, wherein R¹ is ethyl.

11. A process as claimed in claim 1, wherein R¹ is propyl.

12. A process as claimed in claim 1, wherein R³ is methyl.

13. A process of preparing substantially clear aqueous solutions of silanols and siloxanols which comprises emulsifying slightly acid water and a member selected from the group consisting of (a) $\quad R_nSi(OR^1)_{4-n}$ wherein R is selected from the group consisting of methyl, ethyl, vinyl, β-cyanoethyl, β-carbethoxyethyl and γ-mercaptopropyl, R¹ is alkyl of 1-3 carbon atoms, $n$ has a numerical value of from 0 to 2, and (b) $\quad \left[ \begin{array}{c} R^3 \\ -Si-M-O- \\ R^2 \end{array} \right]_x$ wherein R² is alkoxy of 1-3 carbon atoms, R³ is selected from the group consisting of lower alkyl and alkoxy of 1 to 3 carbon atoms, M is $(CH_2)_3$ and $x$ is a positive whole number, and letting the emulsion thus formed stand until a substantially clear solution has been formed.

References Cited

UNITED STATES PATENTS

| | | | |
|---|---|---|---|
| 2,058,844 | 10/1936 | Vaughn | 260—448.8 |
| 2,597,614 | 5/1952 | Brown et al. | 260—29.2 |
| 2,832,754 | 4/1958 | Jex et al. | 260—448.8 |
| 2,833,658 | 5/1958 | May | 260—448.8 |
| 2,840,087 | 6/1958 | Hersh | 260—29.2 |
| 2,944,942 | 7/1960 | Charle et al. | 260—448.8 |
| 3,079,361 | 2/1963 | Plueddemann | 260—448.8 |
| 3,101,277 | 8/1963 | Eder et al. | 260—448.8 |
| 3,325,439 | 6/1967 | Steinbach | 260—448.2 X |
| 3,146,252 | 8/1964 | Emblem et al. | 260—448.8 |

TOBIAS E. LEVOW, *Primary Examiner.*

SAMUEL H. BLECH, *Examiner.*

P. F. SHAVER, *Assistant Examiner.*